US007544250B2

(12) United States Patent
Hüttlin

(10) Patent No.: US 7,544,250 B2
(45) Date of Patent: Jun. 9, 2009

(54) METHOD AND APPARATUS FOR TREATING PARTICULATE-SHAPED MATERIAL, IN PARTICULAR FOR MIXING, DRYING, GRADUATING, PELLETIZING AND/OR COATING THE MATERIAL

(76) Inventor: Herbert Hüttlin, Rümminger Strasse 15, 79539 Lörrach (DE)

( * ) Notice: Subject to any disclaimer, the term of this patent is extended or adjusted under 35 U.S.C. 154(b) by 558 days.

(21) Appl. No.: 10/816,642

(22) Filed: Apr. 2, 2004

(65) Prior Publication Data

US 2005/0145728 A1 Jul. 7, 2005

Related U.S. Application Data

(63) Continuation of application No. PCT/EP02/10175, filed on Sep. 11, 2002.

(30) Foreign Application Priority Data

Oct. 2, 2001 (DE) .................................. 101 49 764

(51) Int. Cl.
*B05B 17/00* (2006.01)
(52) U.S. Cl. ....................... 118/303; 118/313
(58) Field of Classification Search ................ 118/303, 118/315, 313, 16, 20, 19, 58, 62, 64; 366/101, 366/102, 107, 167.1, 170.3; 34/586; 494/25, 494/26, 27, 29
See application file for complete search history.

(56) References Cited

U.S. PATENT DOCUMENTS 872,729 A * 12/1907 Hiller ............................ 366/9
3,734,471 A * 5/1973 Engels ..................... 366/170.3

(Continued)

FOREIGN PATENT DOCUMENTS

DE 872 928 9/1953

(Continued)

*Primary Examiner*—Brenda A Lamb
(74) *Attorney, Agent, or Firm*—St. Onge Steward Johnston & Reens LLC

(57) ABSTRACT

An apparatus for treating a particulate material, in particular for mixing, drying, granulating, pelletizing and/or coating the material, has a container which has a process chamber arranged around a longitudinal mid-axis of the container and formed as an annular chamber, and also a container central duct, separated from the process chamber, as a flow duct for process air, which duct opens into the lower region of the process chamber, an upper region of the process chamber being open. In at least one first operating state, the upper open region of the process chamber communicates with the container central duct so as to conduct process air, by the container central duct widening circumferentially towards the upper region of the process chamber and opening towards the process chamber. In a method for treating particulate material, the material is put into the container, and process air is introduced from the container central duct into the lower region of the process chamber and flows upwards in the process chamber in order to move the material in the process chamber. The process air emerges from the process chamber again from the upper region of the latter, the process air, at least in a first treatment phase, after emerging from the upper region of the process chamber, being led at least partly into the container central duct in a continued circulation-type flow and there being led downwards again, where it is introduced into the process chamber once more.

22 Claims, 5 Drawing Sheets

U.S. PATENT DOCUMENTS

| | | | |
|---|---|---|---|
| 4,002,325 A | * | 1/1977 | Herfeld ................. 366/101 |
| 4,168,913 A | * | 9/1979 | Kono ...................... 366/3 |
| 4,390,284 A | * | 6/1983 | Hyde et al. ............ 366/165.5 |
| 4,858,552 A | | 8/1989 | Glatt et al. ................ 118/19 |

FOREIGN PATENT DOCUMENTS

| | | |
|---|---|---|
| DE | 1 849 891 | 4/1962 |
| DE | 4006935 | 12/1991 |
| EP | 0 103 894 | 3/1984 |
| EP | 0 212 397 | 1/1986 |
| EP | 0 370 167 | 5/1990 |
| WO | WO 00/10699 | 3/2000 |

* cited by examiner

METHOD AND APPARATUS FOR TREATING PARTICULATE-SHAPED MATERIAL, IN PARTICULAR FOR MIXING, DRYING, GRADUATING, PELLETIZING AND/OR COATING THE MATERIAL

CROSS REFERENCE TO OTHER APPLICATIONS

The present application is a continuation of pending international patent application PCT/EP02/10175, filed on Sep. 11, 2002 which designates the United States, and which claims priority of German patent application 101 49 764.4, filed on Oct. 2, 2001.

BACKGROUND OF THE INVENTION

The invention relates to a method and to an apparatus for treating particulate material.

The invention relates in particular to a method for treating and an apparatus for treating particulate material, which comprises mixing, drying, granulating, pelletizing and/or coating the material.

The invention also relates to an apparatus for carrying out the aforementioned method.

During granulating, the particles of the material, starting from a powdery state, are agglomerated to form larger particles by being moistened within the process chamber.

During pelletizing, the material, likewise starting from a powdery state, is agglomerated to form larger particles by moistening the material but, as distinct from granulation, the said particles have a spherical form.

During coating, particles or previously produced granules or pellets are provided with a covering or varnished. The coating can in particular follow a granulating or pelletizing operation.

In the case of the apparatus disclosed by EP-A 0 103 894 the container central duct is formed as a dip pipe which dips centrally into the container from above and through which process air is led from top to bottom, is introduced into the process chamber from the lower opening in the container central duct and flows upwards in the process chamber and escapes from the upper region of the process chamber, from which it is then led to the outside from the container. The process air for moving the material is continuously tracked by an external process air feed system, which is also designated an air handling system. This type of process air guidance leads to the following disadvantages.

At the start of the treatment of the particulate material, the latter is normally present in the powdery state. During granulating or pelletizing, the powdery particulate material is moistened in the process chamber. However, since the moistening action cannot cover the entire material at the same time, a mixture of light powdery particles and heavier, moist and partly already agglomerated particles is formed in the particulate material. In the known apparatus and the known process, the disadvantage consists in the fact that, because of the upwardly directed process air stream prevailing in the process chamber, the still powdery proportion of the material is carried along with the process air as the latter escapes from the process chamber and is thus removed from the process and, for example, is collected on a waste air filter. In the case of this known apparatus and the known method, complete feedback of the still powdery proportion into the lower region of the process chamber, that is to say into the under-bed, is not ensured.

An apparatus and a process that are comparable with this known apparatus and the known method are disclosed by EP-A-0 212 397, in which the disadvantages mentioned previously likewise continue. In this apparatus and this method, it is not ensured either that the still air-separable powdery proportion of the particulate material which has been removed from the treatment process is fed completely to the latter again.

Furthermore, EP-A-0 370 167 discloses an apparatus and a method which can be compared with the aforementioned apparatuses and the aforementioned methods, but which differs from the apparatuses and methods described previously in that the process air, after emerging from the lower region of the container central duct, before entering the process chamber, is led through a ring of guide plates, which overlap one another as viewed in the direction of the container axis and impart a spin to the upwardly directed air stream. However, even in the case of this known apparatus and this known method, no measure is taken to reliably prevent the still air-separable proportion of the particulate material being removed from the treatment process.

DE-PS-872 928 discloses an apparatus for relayering, loosening and/or mixing bulk materials in silos and the like. This known apparatus has a pipe which dips into a container, through which process air is led into the lower part of the container and is led upwards again through a narrow cylindrical annular space around the pipe. In the annular space, the material to be mixed is moved upwards, emerges at the top and falls back into the lower region of the container under the action of the force of gravity. Disadvantageously, a dense core bed, in which the material is more or less not moved, is formed in the lower region of the container.

Finally, German utility model DE U 1 849 891 discloses a container for mixing dust-like material, in which a plurality of upright, cylindrical material suction pipes of different lengths connected to a separator, and an upright central pipe for feeding back air from the separator are arranged, the air feedback pipe having air outlet openings at different heights corresponding to the suction openings of the suction pipes. The outlet openings of the pressure pipe, made at various heights, correspond to the inlets of the different upright suction pipes. The intention is, as a result, at various points in the mixing container, to produce cross-flows, whose effectiveness is increased by introducing loosening air at the bottom of the container. The material to be mixed is taken in at various points of the container, and material and air are fed back into the container separately at different points at a distance from one another. Even with an apparatus of this type, fluidizing movement of the particulate material cannot be achieved.

SUMMARY OF INVENTION

The invention is based on the object of developing a method and an apparatus of the type mentioned at the beginning with the effect that, as far as possible, it is ensured that all of the particulate material put into the container participates in the treatment process.

According to one aspect of the invention, a method for treating particulate material is provided, comprising the steps of filling said material into a container having a process chamber arranged around a longitudinal mid-axis of said container and formed as an annular chamber, said container further having a container central duct separated from said process chamber, moving said material in said process chamber by introducing process air into a lower region of said process chamber from said container central duct which process air flows upwards in said process chamber and emerges from said process chamber again from an upper region of said process chamber, leading said process air after emerging from said upper region of said process chamber, at least in a first treatment phase, at least partly into said container central duct in a continued, circulation-type flow, and leading said process air downwards again, where it is introduced into said process chamber again.

According to another aspect of the invention, an apparatus for treating particulate material is provided a container having a process chamber and a container central duct separated from said process chamber, said container further having a longitudinal mid-axis, said process chamber being arranged around said longitudinal mid-axis of said container and being formed as an annular chamber, said process chamber further having a lower region and an upper region which is open, said container central duct forming a flow duct for process air and opening into said lower region of said process chamber, and communicating with said upper open region of said process chamber so as to conduct said process air in at least one first operating state, by said container central duct widening circumferentially and opening towards said upper region of said process chamber.

According to a further aspect of the invention, an apparatus for treating particulate material is provided a container having a process chamber and a container central duct separated from said process chamber, said container further having a longitudinal mid-axis, said process chamber being arranged around said longitudinal mid-axis of said container and being formed as an annular chamber, said process chamber further having a lower region and an upper region which is open, said container central duct forming a flow duct for process air and opening into said lower region of said process chamber, and communicating with said upper region of said process chamber so as to conduct process air in at least one first operating state, a fan arranged in a lower region of said container central duct and arranged immediately adjacent to an opening area of said container central duct into said process chamber.

Accordingly, in the method according to the invention and the apparatus according to the invention, the process air which emerges from the upper region of the process chamber is no longer led away from the container, as in the case of the known methods and the known apparatuses, but is introduced into the container central duct again, which, for this purpose, widening towards the upper region of the process chamber, opens towards the process chamber. After flowing through the container central duct, the process air is introduced into the lower region of the process chamber again. This has the effect that the still air-separable proportion of the particulate material is carried along into the container central duct by the process air emerging from the upper region of the process chamber and, with the said process air, is fed to the process chamber and therefore to the process again in the lower opening region of the container central duct in the lower region of the process chamber. At the same time, the still air-separable proportion of the particulate material is particularly advantageously fed back into the under-bed of the process chamber, so that it is ensured that the particulate material fed back participates in the complete process within the process chamber. In particular during granulating or pelletizing, in which the particulate material in the process chamber is acted on with a moist medium, it is thus advantageously ensured that all of the particulate material can be acted on with the moist medium. The first treatment phase can last until all of the particulate material has been moistened. With increasing process duration, the air-separable proportion of the particulate material, that is to say the powdery proportion, decreases until all of the particulate material has been moistened and then, by means of the process air, is still moved only within the process chamber, e.g. in a fluidized circulating movement.

In a preferred refinement of the process, the flow of the process air in the lower region of the container central duct is produced adjacent to the opening area into the process chamber, so that a suction pressure which is oriented downwards is present in the container central duct.

In the apparatus, provision is preferably made that, in the lower region of the container central duct, a fan is arranged immediately adjacent to the opening area into the process chamber.

The advantage in this refinement of the method and of the apparatus consists in the fact that, on account of the suction pressure produced in the container central duct by means of the fan, particularly effective forcible guidance of the process air and therefore of the air-separable proportion of the particulate material through the container central duct into the under-bed of the process chamber is achieved. As a result of producing the process air stream in the container itself and as a result of arranging the fan in the interior of the container, the advantageous possibility is also opened up of implementing the process air stream for moving the material in the process chamber independently of an external process air feed system or air handling system. In the case of the known apparatuses mentioned at the beginning, process-air blowers or fans were only provided outside the apparatus, which had the disadvantage that the air handling systems, normally configured in the form of monobloc units, had to be designed to be so stable that they could withstand the relatively high static process pressures of 2500 to 10 000 Pa. This disadvantage is avoided by the refinement mentioned previously, since the process air stream required to move the particulate material with the requisite high pressures is produced by the integrated fan in the interior of the container. It goes without saying that, in the case of the apparatus according to the invention, an external air handling system for feeding process air or with a simple drying function can additionally be provided, but this then no longer has to satisfy the high stability requirements but can correspond to the normal air-conditioning systems for feed air and waste air, which means that considerable costs can be saved.

Producing the process air stream by means of the fan arranged in the lower region of the container central duct also has the advantage that the process air is introduced circumferentially uniformly at the required pressure into the under-bed of the particulate material to be moved.

The previously mentioned preferred refinement of the method and the previously mentioned preferred refinement of the apparatus are in each case viewed as independent inventions on their own.

The fan in the lower region of the container has the further advantage that it permits cleaning of the interior of the container, at least of the process chamber. For this purpose, after the process has been completed, the container can be filled with washing liquid and, by setting the fan moving, the washing liquid is moved in the container with a high cleaning effect. The fan in the lower region of the container thus advantageously permits washing in place.

In a further preferred refinement of the method, the process air is introduced into the process chamber with a centrifugal and tangential spin.

In the apparatus, provision is preferably made for this purpose for the fan to have fan blades which extend substantially radially and vertically, whose radially outer ends at least partly project, substantially with a suitable shape, into the opening area between the container central duct and the process chamber.

In this case, it is advantageous that the material fed back into the process chamber via the container central duct, which, in the process, flows past the fan blades, is given a spin-like centrifugal and tangential movement component. As a result, an optimum level of mixing of the material to be treated is effected. During pelletizing, the advantage is additionally achieved that the action of making the agglomerated particles spherical is improved.

In a further preferred refinement of the apparatus, the radially outer ends of the fan blades are curved backwards as viewed in the direction of rotation of the fan.

This measure has the advantage that the process air and the material fed back into the process chamber are imparted a pronounced tangential movement component.

In a further preferred refinement of the apparatus, the fan blades extended to different radial extents.

This measure advantageously contributes to further improved mixing of the material as it enters the process chamber.

In a further preferred refinement of the method, in the first treatment phase, the process air is circulated in the container as a substantially closed circulation system.

In this case it is advantageous that, in the first treatment phase, it is ensured that all of the material is fed to the process and not removed, with the effect of the aforementioned under-bed feeding.

In a further preferred refinement of the method, in at least one second treatment phase, process air is additionally fed into the container central duct from outside the container and is introduced into the lower region of the process chamber.

In a preferred refinement of the apparatus, for this purpose the container is connected or can be connected to an external process air feed system and has a feed duct which is connected to the container central duct.

While, in the first treatment phase, for example the moist phase of a granulating or pelletizing operation, the process air can circulate exclusively in a closed circuit, the measure mentioned above has the advantage that, in a second treatment phase, process air can be fed in from outside, dry is used to handling the moist material and for this purpose can be conditioned appropriately by an external air treatment system. In this case, the process air fed in from outside preferably performs only the function of drying, while the process air for moving the material in the process chamber is preferably produced only by the fan in the lower region of the container central duct. As a result, the external process air feed system additionally provided can be configured very economically and simply, since it does not have to produce the necessary high pressures which are required to move the material.

If, as in the aforementioned preferred refinement, the container is connected or can be connected to an external process air feed system, in the apparatus it is further preferred if a valve or bulkhead is provided in order to connect the feed air duct to the container central duct so as to conduct process air or to seal off the said duct with respect to the feed air duct.

As a result of this measure, it is advantageously possible to switch over between external process air feeding and only internal process air circulation within the container.

In the process according to the invention, it is further preferable if, in the second treatment phase, the process air emerging from the process chamber from the upper region of the latter is at least partly led away to outside the container without being fed back into the process chamber via the container central duct.

In the apparatus, provision is preferably made for this purpose, in an operating state in which the feed air duct is connected to the container central duct so as to conduct process air, for the valve or bulkhead to seal off the container central duct in a substantially airtight manner with respect to the upper open region of the process chamber.

In this case, it is advantageous that, in the case in which process air is fed in from outside, for example for drying the material to be treated, it can be ensured that the moist process air leaving the process chamber is led away to the outside and is dried or replaced by fresh air, by which means the drying operation can be accelerated.

In a further preferred refinement of the process, it is likewise preferred for the transition between the first treatment phase and the second treatment phase to be carried out in a smooth manner.

In a preferred refinement of the apparatus, for this purpose the valve or bulkhead has at least one operating position in which both the feed air duct is connected to the container central duct and the container central duct is connected to the upper open region of the process chamber, both so as to conduct air.

In this case, it is advantageous that the second treatment phase, in which process air is fed in from outside, can already be initiated while the continued under-bed feed of an air-separable proportion of the material to be treated is still being carried out in the first treatment phase. In this way, if this is desired, intense drying of the moist, e.g. already agglomerated, material with process air additionally fed in can even be carried out in the first treatment phase, while it continues to be ensured that air-separable material, which can still be present, is fed to the process again and is not removed.

In a further preferred refinement of the method, the process air fed in from outside the container is led through a filter arranged above the process chamber.

In a preferred refinement of the apparatus, above the process chamber there is arranged a filter that is connected into the flow path of the feed air duct.

In this case, it is advantageous that the particulate material that collects on the underside of the filter is blown off by the process air fed in from outside and is blown into the container central duct, through which it is then led into the process chamber again, so that not only is cleaning of the filter achieved in an advantageous manner but, at the same time, also virtually complete feeding of the filtrate back into the process.

In this connection, in a further preferred refinement of the apparatus, the feed air duct has a first shoe arranged above the filter and covering a sector of the latter, and a second shoe opposite the first shoe, underneath the filter, which is connected to the container central duct, it being possible for the first and the second shoe to be set into a circulating movement on the filter.

This measure has the particular advantage that the filter arranged above the process chamber and preferably of a flat construction can be cleaned effectively along its entire surface on account of the circulating movement of the first shoe and of the second shoe, and that the filtrate cleaned off is fed back into the under-bed of the process chamber by the second, lower shoe, which circulates together with the first, upper shoe, and further by the container central duct.

In a further preferred refinement of the method, in the first treatment phase, the material is acted on with a first moist medium in the lower opening area of the container central duct into the process chamber.

In a preferred refinement of the apparatus, for this purpose at least one first spray nozzle for spraying a first moist medium is arranged in the region of the lower opening of the container central duct into the process chamber, its spraying direction being oriented substantially into the process chamber.

In this case it is advantageous that, in the first treatment phase, in which in particular the air-separable proportion of the material is still being fed into the lower region of the process chamber again via the container central duct, the said material is acted on completely and uniformly with the first moist medium. In this refinement, the apparatus according to the invention is suitable in particular for granulating or pelletizing.

In conjunction with the preferred refinement according to which a fan is arranged in the lower region of the container central duct, it is further preferred for the at least one spray nozzle for spraying the first moist medium to be arranged on the fan and to revolve with the latter.

This measure advantageously contributes to even more uniform action on the material to be treated with the first moist medium, since the sprayed medium covers the entire circumference of the container as the fan revolves.

In this case, it is further preferred if the spraying direction of the at least one spray nozzle is oriented substantially tangentially backwards as based on the direction of rotation of the fan.

In this case it is advantageous that the spraying direction is matched optimally to the movement of the material.

In a further preferred refinement of the method, in the second treatment phase, the material is acted on with a second moist medium within the process chamber.

In the apparatus, for this purpose at least one second spray nozzle for spraying a second moist medium onto the material is provided, which is arranged in the lower region of the process chamber and whose spraying direction is oriented substantially vertically.

In this case, it is advantageous that, after the air-separating effect of the first treatment phase has been concluded and the material is now moving exclusively in a fluidized manner in the process chamber, the said material can be subjected to another treatment operation, for example, in this refinement, a coating process can be carried out.

It goes without saying that, in a transition phase between the first treatment phase and the second treatment phase, both the at least one first spray nozzle and the at least one second spray nozzle can be operated simultaneously, in particular when, according to one of the aforementioned refinements, filtrate cleaned off the filter is still being fed into the process chamber via the container central duct.

Further advantages and features emerge from the following description and the appended drawing.

It goes without saying that the features mentioned above and those still to be explained below can be used not only in the respectively specified combination but also in other combinations or on their own without departing from the scope of the present invention.

BRIEF DESCRIPTION OF THE DRAWINGS

An exemplary embodiment of the invention is illustrated in the drawing and will be described in more detail below with reference thereto. In the drawing.

DETAILED DESCRIPTION OF PREFERRED EMBODIMENTS

Figure 1:
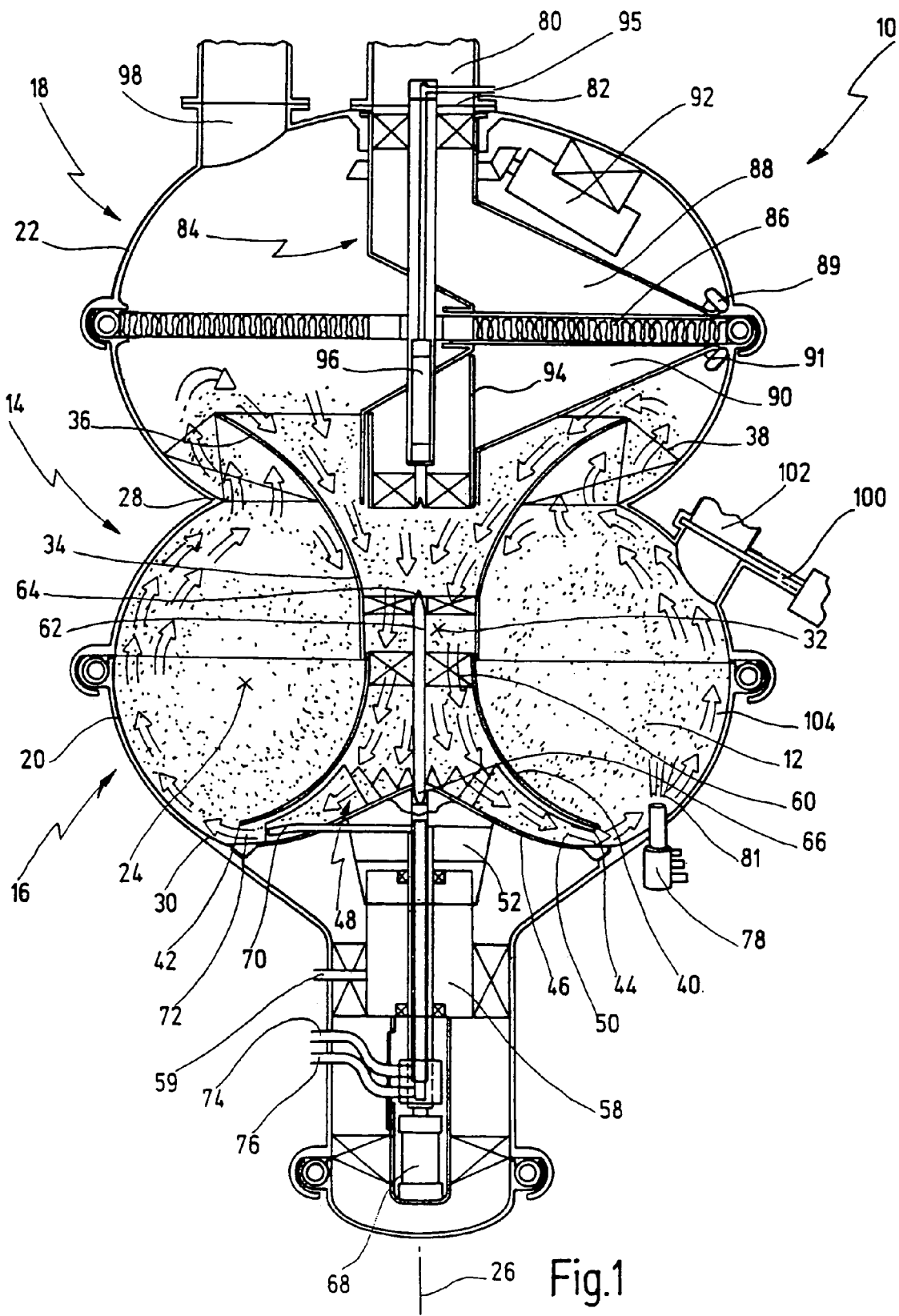
FIG. 1 shows an overall illustration of an apparatus for treating particulate material in a schematic longitudinal section, the apparatus being illustrated in a first operating state, in which a first treatment phase of the method carried out with the apparatus is illustrated.
Figure 2:
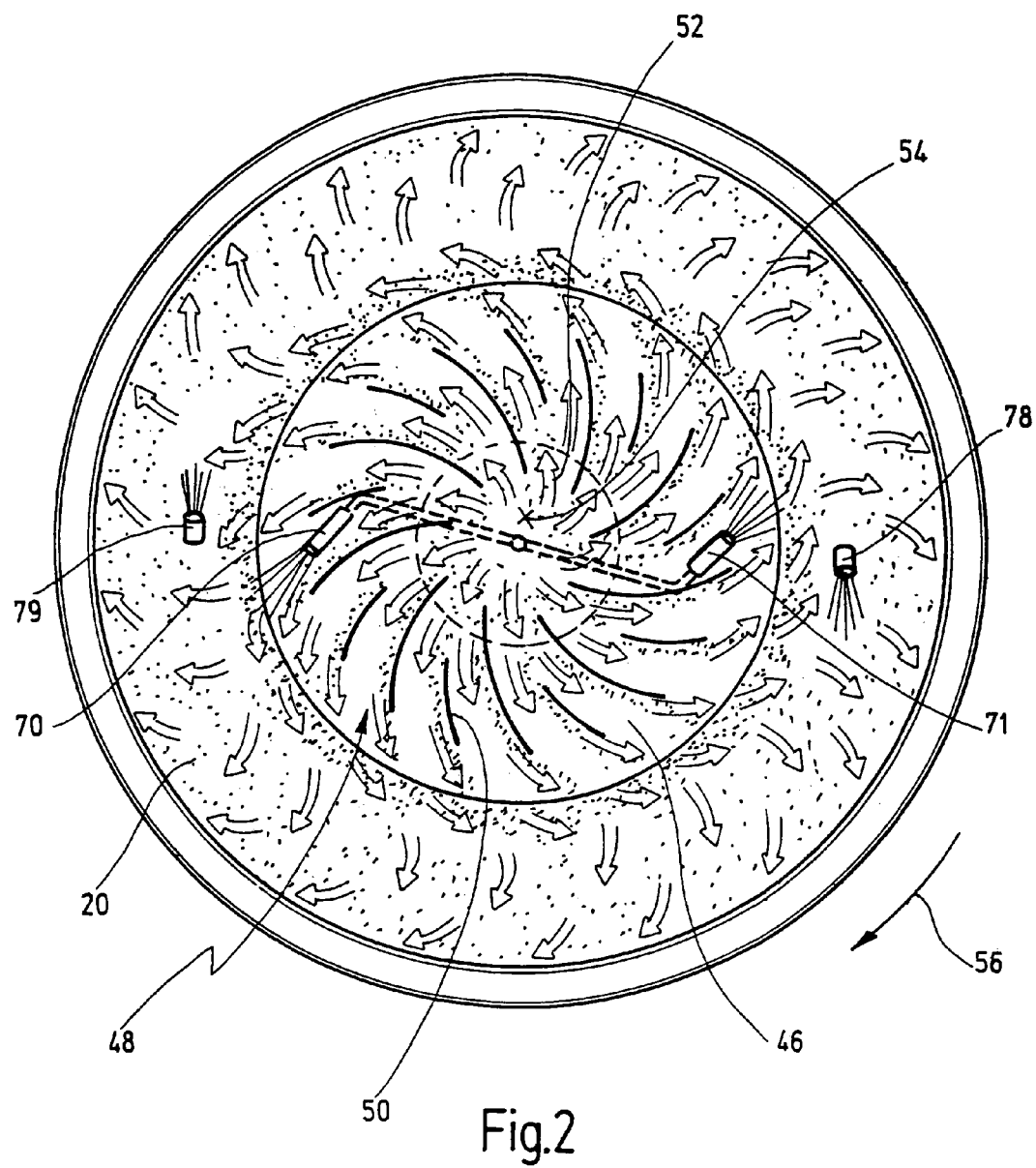
FIG. 2 shows a section through the apparatus in FIG. 1 along the line II-II in FIG. 4.
Figure 3:
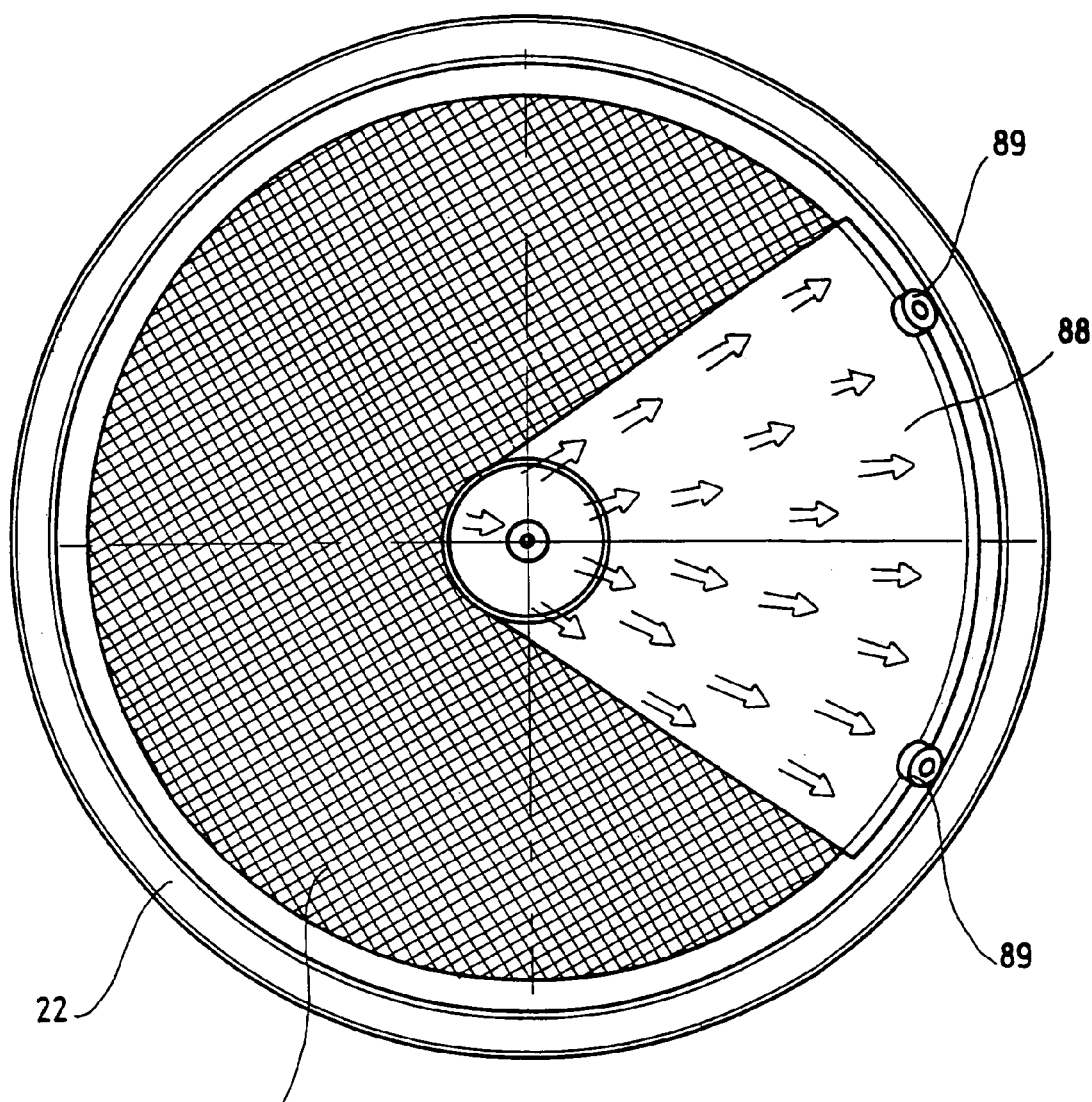
FIG. 3 shows a section through the apparatus in FIG. 1 along the line III-III in FIG. 4

In FIG. 1, an apparatus for treating particulate material, in particular for mixing, drying, granulating, pelletizing and/or coating the material, is illustrated and provided with the general reference numeral 10. Further details of the apparatus 10 are illustrated in FIGS. 2 and 3.

In FIG. 1 and in FIG. 2, in order to illustrate the method still to be described later, which is carried out with the apparatus 10, the particulate material is illustrated by dots.

The apparatus 10 generally has a container 14. The container 14 has a first, lower container section 16 and a second, upper container section 18. Assigned to the first container section 16, on the outer circumference, is a first housing section 20, while the second container section 18 is assigned, on the outer circumference, a second housing section 22.

The container 14, more precisely, the first container section 16, has a process chamber 24 formed as an annular chamber. The process chamber 24 formed as an annular chamber is rotationally symmetrical with respect to a longitudinal mid-axis 26 of the container 14. On the outside, the process chamber 24 is bounded by the first housing section 20, which is curved outwards spherically, preferably in the form of a spherical section. An upper end section 28 of the first housing section 20, seen in the longitudinal direction of the longitudinal mid-axis 26, forms an upper radially outer end of the process chamber 24, while a lower end section 30 of the first housing section 20 correspondingly forms a radially outer lower end of the process chamber 24.

Also present in the container 14 is a container central duct 32 which, in the exemplary embodiment shown, is preferably arranged centrally in the container. The container central duct 32 is fully separated circumferentially from the process chamber 24, specifically by an air-impermeable body 34 which widens towards the top and towards the bottom and which surrounds the longitudinal mid-axis 26 rotationally symmetrically and completely.

An upper section 36 of the body 34, which widens outwards in a curved manner, as seen in the longitudinal direction of the longitudinal mid-axis 26, projects beyond the upper end section 28 of the first housing section 20 and therefore the process chamber 24, that is to say the upper section 36, projects into the second container section 18.

The upper section 36 of the body 34 is fixed to the second housing section 22 via holders 38 distributed circumferentially.

The body 34 is constructed in two parts overall, a lower section 40, as based on the longitudinal direction of the process chamber 24, extending in the direction of the longitudinal mid-axis 26 approximately from the centre of the process chamber 24 as far as the lower end of the latter. The lower section 40 is formed so as to widen radially outwards in a curved manner.

An outermost lower end 42 of the body 34 or the lower section 40 of the body 34 is spaced apart vertically from the lower end section 30 of the first housing section 20, so that between the outermost lower end 42 of the body 34 and the lower end section 30 of the first housing section 20 there is formed an annular gap 44, which forms an opening area of the container central duct 32 into the process chamber 24. As seen from the longitudinal mid-axis 26, this opening area tapers outwards between the lower section 40 of the body 34 and a base 46 falling radially outwards underneath the body 34, as far as the outermost end 42 of the body 34.

In the lower region of the container central duct 32 and, more accurately, on the base 46 of the duct 32, there is arranged a fan 48 which is arranged concentrically with respect to the longitudinal mid-axis 26, the base 46 being part of the fan 48 and rotating with the latter. The fan 48 is arranged immediately adjacent to the opening area of the container central duct 32 into the process chamber 24.

As emerges from FIG. 1 in conjunction with FIG. 2, the fan 48 has a large number of fan blades 50 which extend substantially radially and vertically and whose radially outer ends at least partly project, substantially with a suitable shape, into the opening area between the container central duct 32 and the process chamber 24. The fan 48 is arranged horizontally in the container central duct 32, the fan blades 50 being fixed to the base 46 of the fan 48. As seen from the centre of the fan 48, the fan blades 50, which are in the form of scoops, do not extend as far as the centre of the base 46 but leave a central region 54 of the base 46 free.

As seen in the direction of rotation of the fan 48, which is indicated by an arrow 56 in FIG. 2, the radially outer ends of the fan blades 50 are curved backwards. As further emerges from FIG. 2, the fan blades 50 extend to different extents in the radial direction, to be specific the ends of the fan blades 50 pointing towards the centre of the fan 48 in each case end in pairs offset at different distances from the centre of the fan. Arranged under the fan 48 is a drive 58 having a drive element 52 which is provided in order to drive the fan 48 in rotation.

The base 46 is fixed to the drive element 52. The drive 58 is preferably a pneumatic hollow-tube in rotation or hollow-shaft drive motor with preferably continuous control of rotational speed. A connection 59 for the compressed air feed is provided on the container 14.

The lower section 40 of the body 34 is firmly connected to a shaft 62 so as to rotate with it via circumferentially distributed holders 60, the shaft in turn being mounted via an upper idler bearing 64 on the static upper section 36 of the element 34 and via a lower idler bearing 66 on the drive element 52 of the fan 48. Therefore, the lower section 40 of the body 34 can be set rotating in the direction of rotation of the fan 48, for example because of air friction.

The lower section 40 of the body 34 further forms a cover for the fan blades 50 of the fan 48, the fan blades 50 and the lower section 40 of the body 34 being matched to one another with a suitable shape.

The fan 48 together with the base 46 can be raised via an axial drive 68 together with the lower section 40 of the body 34, the action of raising the fan 48 and the base 46 being used to empty the material out of the container 14, as will be described later.

Furthermore, in the lower opening area of the container central duct 32 into the process chamber 24 there is arranged at least one first spray nozzle 70, in the present exemplary embodiment there are two spray nozzles 70 and 71, for spraying a first moist medium 72. The spraying direction of the two spray nozzles 70 (cf. FIG. 2) is oriented substantially into the annular gap 44, that is to say into the opening and into the process chamber 24.

The two spray nozzles 70 and 71 are arranged on the fan 48 and revolve with the latter.

In this case, as based on the direction of revolution of the fan 48, the spray nozzles 70 and 71 are oriented substantially tangentially backwards, according to the arrow 56. The spraying direction of the spray nozzles 70 and 71 in this case substantially corresponds to the orientation of the radially outer ends of the fan blades 50.

In the lower region of the container 14, connections 74 and 76 for spraying air and liquid are appropriately provided to supply the spray nozzles 70 and 71.

In the process chamber, to be specific in its lower region in the first housing section 20, at least one second spray nozzle is provided, in the present exemplary embodiment there are two spray nozzles 78 and 79, for spraying a second moist medium 81 onto the material, the spraying direction of the second nozzles 78 and 79 being oriented substantially vertically and preferably additionally with a tangential component.

The container 14 is also connected or can be connected to an external process air feed system, not specifically illustrated, of which in FIG. 1, as a detail, there is illustrated only a line 80, which can be connected to an air inlet opening 82 provided on the top of the second container section 18. The container 14 has a feed air duct 84 following the air inlet opening 82 in the second container section 18. Connected into the feed air duct 84 is a filter 86, which is preferably formed as a disc-like deep-filter knitted fabric of flat construction and made of stainless steel composite material, plastic and/or textile fabric. In this case, the filter 86 extends over the entire diameter of the container 14 and, respectively, of the second container section 18.

The feed duct 86 has a first shoe 88 arranged above the filter 86 and, opposite the first shoe and underneath the filter 86, a second shoe 90. As emerges from FIG. 3, which shows a plan view of the filter 86, the first shoe 88, and the same applies to the second shoe 90, covers a sector of the filter 86, in the present exemplary embodiment a sector of about 60°, generally about 15°-90°, of the filter 86, which is round and flat here.

By means of the drive 92, the first shoe 88 and the second shoe 90 are set rotating around the longitudinal mid-axis 26 of the container 24 in a movement in the same direction and with the same phase, as a result of which the first shoe 88 and the second shoe 90 sweep over the entire surface of the filter 86. The first shoe 86 and the second shoe 90 are mounted and guided by means of appropriate running rollers 89 and 91 so that they roll on the inner side of the second housing section 22.

The feed air duct 84 is connected to the container central duct 32 via the second shoe 90. Arranged in the feed air duct 84, more precisely in the second shoe 90, is a valve 94 or bulkhead, whose function consists in connecting the feed air duct 84 to the container central duct 32 so as to conduct process air or to seal off the duct 32 with respect to the feed air duct 84.

For this purpose, the valve 94 can be moved axially in the direction of the longitudinal mid-axis 26 of the container 14, via a displacement element 96 preferably driven pneumatically via a compressed air connection 95. In FIG. 1, the valve 94 is illustrated in an operating position in which the container central duct 32 is sealed off tightly with respect to the feed air duct 34. In contrast, in its upper region, the container central duct 32 communicates with the upper open region of the process chamber 24.

Figure 4:
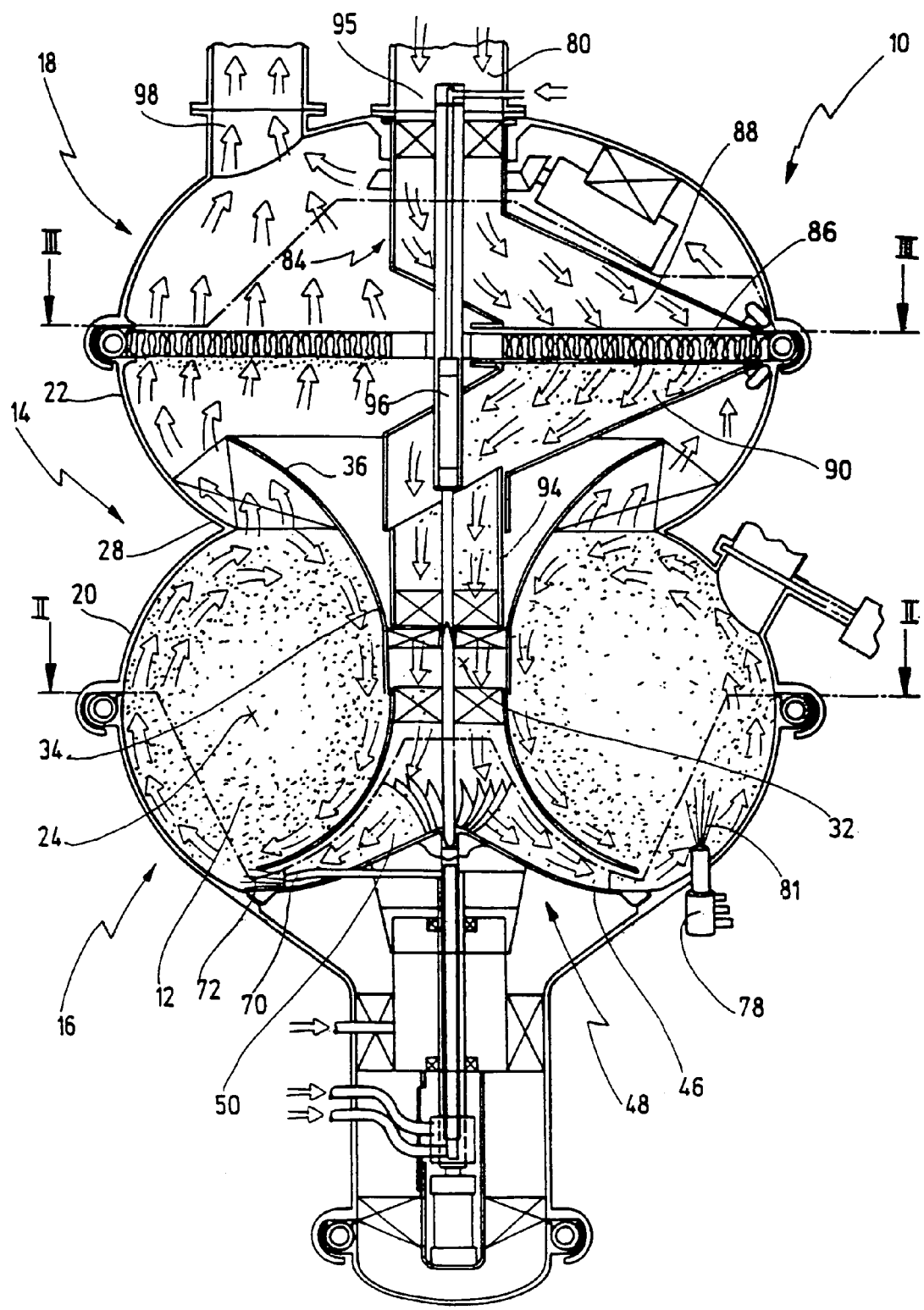
FIG. 4 shows the apparatus in FIG. 1 in a second operating state, in which a second treatment phase of the method carried out with the apparatus is illustrated.

On the other hand, in FIG. 4 the valve 94 is shown in a second operating position, in which the feed air duct 84 is connected to the container central duct 32 so as to conduct process air, but the container central duct 32 is not connected to the upper opening of the process chamber 24 so as to not conduct process air.

However, between the maximum end positions shown in FIGS. 1 and 4, the valve 94 can assume intermediate positions, in which the container central duct 32 is connected both to the feed air duct 84 and to the upper end of the process chamber 24 on the air outlet side so as to conduct process air.

In the second container section 18, beside the air inlet opening 82, there is also an air outlet opening 98.

Furthermore, in its first container section 16, the container 14 has a filling opening 102 which can be closed by a closing element 100 in order to fill the container 14 with the particulate material.

In the following text, by using FIGS. 1 and 4, a method for treating particular material, which can be carried out with the apparatus 10, will now be described.

First of all, the particulate material is put into the container 14 through the filling opening 102, and the filling opening is closed again by means of the closure element 100.

In the case of a granulating or pelletizing operation, the particulate material is initially present in powdery form.

The valve 94 in the feed air duct 84 is in its operating position shown in FIG. 1. In this operating position, no process air is fed into the container 14 from the external process air feed system.

The fan 48 is started up, that is to say set rotating. Thus, in the lower region of the container central duct 32, the fan 48 produces a process air stream with an appropriate pressure, the process air being introduced into the process chamber 24 with a centrifugal tangential spin by the rotation of the fan 48. The process air stream, which is illustrated in FIG. 1 with flow arrows 104, is propagated upwards in the process chamber 24 along the inner side of the first housing section 20 and, in the upper region of the process chamber 24, the process air escapes from the process chamber 24 again. Because of the flow of the process air within the process chamber 24 with the corresponding dynamic pressure, the particulate material in the process chamber 24 is moved, specifically from bottom to top, along the inner side of the first housing section 20. During the movement of the material along this inner side, the particles assume a spacing distance from one another, so that a fluidized movement of the air is achieved.

With the fan 48 running, the material is acted on with the first moist medium by the two first spray nozzles 70 and 71. In this first treatment phase, the particulate material, which has not yet been acted on completely with the first moist medium, is thus present both in a powdery and in an already moistened or agglomerated form. The already moistened or agglomerated particles of the material, because of their higher mass, at the upper end section 28 of the first housing section 20, already have an inertia or a momentum such that they are separated from the process air emerging upwards from the process chamber 24 and move ballistically towards the body 34, along which they slide back again into the lower region of the process chamber 24. The already moistened or agglomerated particles accordingly carry out a substantially circular circulating movement in the process chamber 24.

Meanwhile, the powdery particles of the material which have not yet been moistened do not yet have a sufficient mass and therefore momentum in order to be separated from the process air stream in the upper region of the process chamber.

Then, after emerging from the process chamber from the upper region of the latter, in this first treatment phase the process air is at least partly, completely in a suitable exemplary embodiment, led into the container central duct 32 again and there, because of the downwardly oriented suction pressure effected by the fan 48, led downwards again. The still powdery and therefore air-separable proportion of the particulate material is carried along by the process air emerging from the upper region of the process chamber 24 and is likewise conveyed downwards in the container central duct 32 by the process air stream in the latter. This proportion of the material then comes into contact with the fan blades 50 and, by means of the rotational movement of the fan 48, is fed back into the process chamber 24, specifically into the under-bed of the latter, with a centrifugal tangential movement component and with a spin, partly under the action of the process air stream and partly under the action of the fan blades 50 themselves. In the lower opening area of the container central duct 32 into the process chamber 24, the material moved through there is sprayed with the first moist medium by means of the spray nozzles 70 and 71, which revolve with the fan 48, which ensures that all of the still powdery material is gradually acted on with the first moist medium and, as a result, is moistened and bonded without some of the material being removed from this process.

On account of producing the process air stream by means of the fan 48, in the region of the annular gap 44 between the lower section 40 of the element 34 and the lower end section 30 of the first housing section 20, a spin region is produced which, in particular in the case of pelletizing, promotes the spherical shaping of the pellets.

In the above-described first treatment phase, which can also be designated the moist phase, the process air thus circulates in a substantially closed circuit without the additional feeding of process air from outside. In the case of granulating or pelletizing, the moist phase is used to form granules or spherical particles (pellets).

The first treatment phase is preferably carried out until all of the particulate material has been granulated or pelletized and thus the air-separating effect has been concluded, so that the material is still only moved in a circulating and fluidized manner by the process air in the process chamber 24.

The first treatment phase can then be followed by a drying phase and/or coating phase.

For this purpose, the valve 94 is moved from the operating position illustrated in FIG. 1 to the operating position illustrated in FIG. 4. The container central duct 32 is now connected to the feed air duct 84 and, via the latter, to the external process air feed system, via which process air from outside can be fed in as drying air. The process air fed in from outside is in this case led through the filter 86, the first shoe 88 and the second shoe 90 revolving around the filter 86. Particulate material possibly still adhering to the filter 86 is blown off the filter 86 in the process and, via the container central duct 32, is fed to the process chamber 24 in the under-bed of the latter and therefore to the process again, so that now all the initially still powdery material is fed to the process.

The process air now escaping from the upper region of the process chamber 24 escapes from the air outlet opening 98 via the second container section 18.

In the operating position of the valve 94 according to FIG. 4, the container central duct 32 is no longer connected to the upper region of the process chamber 24, that is to say the air outlet from the process chamber 24, so as to not conduct process air. In this way, the process air which has picked up moisture in the process chamber in order to dry the material can be led away from the container 14 and dehumidified outside the container 14, after which it can be fed to the process again via the feed air duct 84 as dry and appropriately conditioned drying air. Alternatively, the feed apparatus can also be operated in the fresh air/waste air mode.

The process air fed in from outside is not used to move the material in the process chamber 24 but merely for drying or conditioning the material. The process air stream required to move the material is produced solely by the fan 48.

Instead of the operating position shown in FIG. 4, the valve 94 can also be moved into an intermediate position between the operating position illustrated in FIG. 1 and the operating position illustrated in FIG. 4, as a result of which the transition from the first treatment phase to the second treatment phase can advantageously also be carried out in a smooth manner.

If, in the second treatment phase, the granules or pellets formed in the first treatment phase are to be provided with a covering medium, for example varnished, a second moist medium, for example a varnish, can be sprayed into the process chamber 24 with a substantially vertical and preferably also tangential spraying direction component by means of the second spray nozzles 78 and 79, as a result of which the fluidized material in the process chamber 24 can be acted on with the second moist medium.

Figure 5:
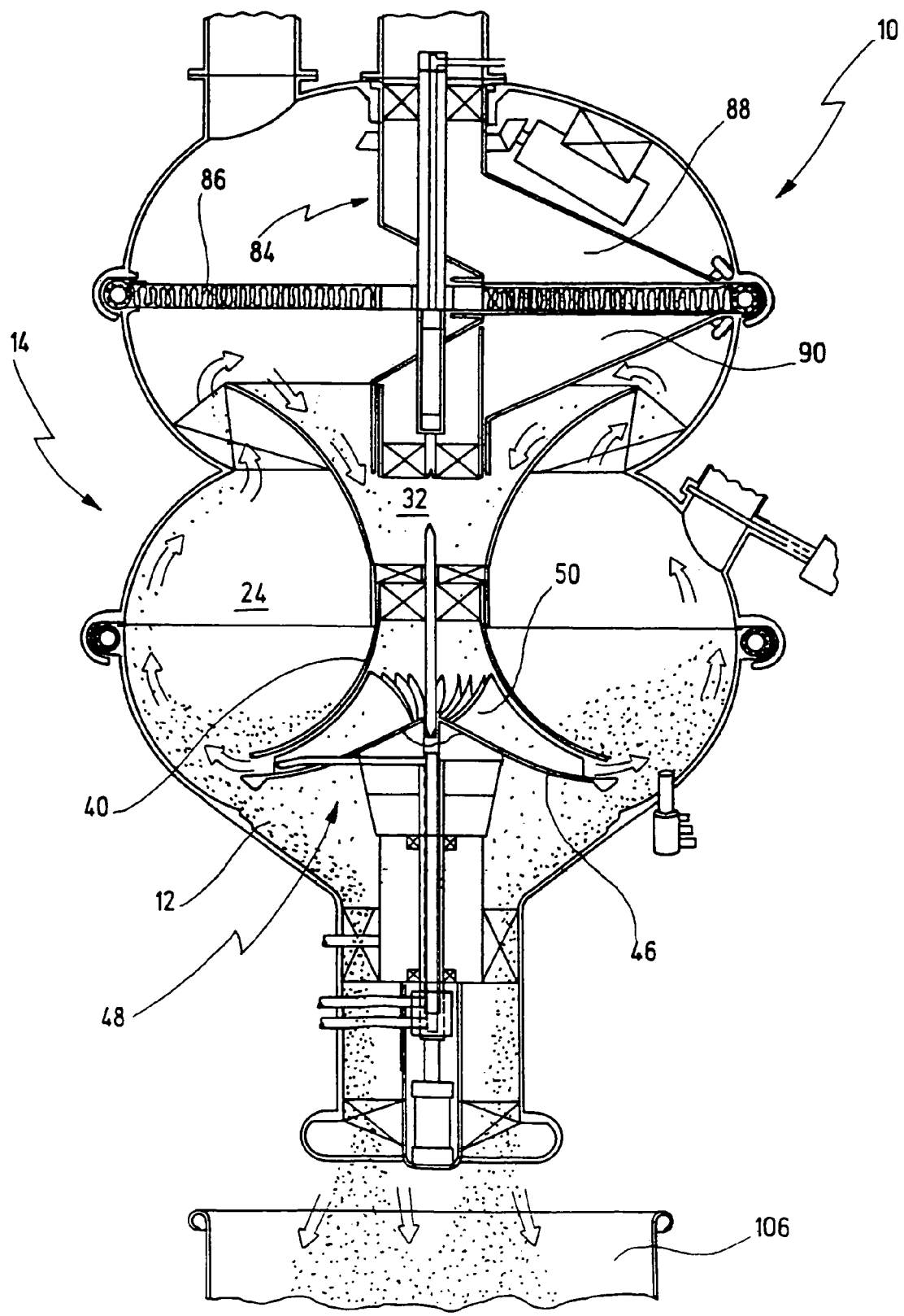
FIG. 5 shows the apparatus in FIGS. 1 and 4 in a third operating state, in which the apparatus is emptied.

Following the completion of the second treatment phase, that is to say following the drying and/or complete coating of the particulate material in the process chamber 24, the particulate material can be emptied out of the container 14 as illustrated in FIG. 5. For this purpose, by means of the axial drive 68, the fan 48 including the base 46 and together with the lower section 40 of the body 34 is raised, so that the particulate material can flow away downwards out of the process chamber 24 and, at the lower end of the container 14, can be emptied into a collecting container 106 present underneath the container 14.

By means of slight rotation of the fan 48, it can be ensured here that residual quantities of particular material which may possibly be located in the fan 48 between the fan blades 50 are thrown out and can ultimately flow away downwards. The valve 94 can be moved into the operating position according to FIG. 1 again for this purpose, as a result of which particulate material located in the upper region can be sucked down completely by the suction action and can likewise be led away.

After being emptied, the interior of the container 14 can be cleaned as follows. In the operating position of the apparatus 10 according to FIG. 5 or in an operating position of the apparatus according to FIG. 1 or 4, washing liquid is put into the container 14 through the filling opening 102, preferably with a filling level approximately as far as the maximum diameter of the process chamber 24. By starting up the fan 48, the washing liquid is then circulated or moved or even agitated very intensively in the container 14, above all in the process chamber 24, by which means a very high cleaning effect is achieved. The washing liquid can then be let out downwards from the container 14 in the operating position of the apparatus 10 according to FIG. 5.

Above the filter 86, a spraying device for spraying washing liquid for cleaning the filter 86 and the interior of the upper container section 18 can additionally further be provided.

The fan 48 thus advantageously permits washing in place or cleaning in place.

What is claimed is:

1. An apparatus for treating particulate material, comprising:
a container having a process chamber for containing said particulate material and a container central duct separated from said process chamber, said container further having a longitudinal mid-axis;
said process chamber being arranged around said longitudinal mid-axis of said container and being formed as an annular chamber, said process chamber further having a lower region and an upper region which is open;
said container central duct forming a flow duct for process air flowing from an upper end of said container central duct to a lower end of said container central duct, and immediately opening into said lower region of said process chamber, and communicating with said upper open region of said process chamber so as to conduct said process air in at least one first operating state, by said container central duct widening circumferentially and opening towards said upper region of said process chamber;
wherein, in a lower region of said container central duct, a fan is arranged immediately adjacent to a location where said container central duct opens into said lower region of said process chamber, wherein said fan has substantially vertical fan blades which extend to different radial extents; and wherein said process chamber is rotatably fixed relative to said container central duct about said container longitudinal mid-axis.

2. The apparatus of claim 1, wherein said container is connectable to an external process air feed system and has a feed air duct which is connected to said container central duct.

3. The apparatus of claim 2, wherein at least one of a valve and a gate is provided in order to connect said feed air duct to said container central duct so as to conduct said process air or to seal off said container central duct with respect to said feed duct.

4. The apparatus of claim 3, wherein, in an operating state in which said feed air duct is connected to said container central duct so as to conduct said process air, said at least one of said valve and said gate seals off said container central duct in a substantially airtight manner with respect to said open upper region of said process chamber.

5. The apparatus of claim 2, wherein at least one of a valve and a gate is provided in order to connect said feed air duct to said container central duct so as to conduct said process air or to seal off said container central duct with respect to said feed air duct, and wherein said at least one of said valve or said gate has at least one operating position in which both said feed air duct is connected to said container central duct and said container central duct is connected to said open upper region of said process chamber, both so as to conduct process air.

6. The apparatus of claim 1, wherein said container is connectable to an external process air feed system and has a feed air duct which is connected to said container central duct, and wherein above said process chamber there is arranged a filter which is connected into the flow path of said feed air duct.

7. The apparatus of claim 6, wherein said feed air duct has a first shoe arranged above said filter and covering a sector of said filter, and the second shoe opposite said first shoe and underneath said filter, which is connected to said container central duct, and wherein said first and said second shoe can be set into a circulating movement on said filter.

8. The apparatus of claim 1, wherein at least one first spray nozzle for spraying a first moist medium is arranged in a lower opening area of said container central duct into said process chamber, its spraying direction being oriented substantially into said process chamber.

9. The apparatus of claim 1, wherein at least one first spray nozzle for spraying a first moist medium is arranged on said fan and revolves with said fan.

10. The apparatus of claim 9, wherein said spraying direction of said at least one spray nozzle is oriented substantially backwards as based on a direction of rotation of said fan.

11. The apparatus of claim 10, wherein at least one second spray nozzle for spraying a second moist medium onto said material is arranged in said lower region of said process chamber and whose spraying direction is oriented substantially vertically and tangentially in a direction of rotation of said fan.

12. An apparatus for treating particulate material, comprising:
- a container having a process chamber for containing said particulate material and a container central duct separated from said process chamber, said container further having a longitudinal mid-axis;
- said process chamber being arranged around said longitudinal mid-axis of said container and being formed as an annular chamber, said process chamber further having a lower region and an upper region which is open;
- said container central duct forming a flow duct for process air and opening into said lower region of said process chamber, and communicating with said upper region of said process chamber so as to conduct process air in at least one first operating state;
- a fan arranged in a lower region of said container central duct for producing a flow of said process air in said container central duct from top to bottom and arranged immediately adjacent to an opening area of said container central duct into said process chamber, wherein said fan has fan blades whose radially outer ends at least partly project into said opening area of said container central duct into said process chamber;
- wherein said radially outer ends of said fan blades are curved backwards as viewed in a direction of rotation of said fan.

13. The apparatus of claim 12, wherein said fan has fan blades which extend to different radial extents.

14. The apparatus of claim 12, wherein at least one first spray nozzle for spraying a first moist medium is arranged on said fan and revolves with said fan.

15. The apparatus of claim 14, wherein a spraying direction of said at least one spray nozzle is oriented substantially backwards as based on a direction of rotation of said fan.

16. The apparatus of claim 14, wherein at least one second spray nozzle for spraying a second moist medium onto said material is provided, which is arranged in said lower region of said process chamber and whose spraying direction is oriented substantially vertically and tangentially in a direction of rotation of said fan.

17. An apparatus for treating particulate material, comprising:
- a container having a process chamber for containing said particulate material and a container central duct separated from said process chamber, said container further having a longitudinal mid-axis;
- said process chamber being arranged around said longitudinal mid-axis of said container and being formed as an annular chamber, said process chamber further having a lower region and an upper region which is open;
- said container central duct forming a flow duct for process air and opening into said lower region of said process chamber, and communicating with said upper open region of said process chamber so as to conduct said process air in at least one first operating state, by said container central duct widening circumferentially and opening towards said upper region of said process chamber;
- wherein said container is connectable to an external process air feed system and has a feed air duct which is connected to said container central duct, and wherein above said process chamber there is arranged a filter which is connected into the flow path of said feed air duct.

18. The apparatus of claim 17, wherein said feed air duct has a first shoe arranged above said filter and covering a sector of said filter, and the second shoe opposite said first shoe and underneath said filter, which is connected to said container central duct, and wherein said first and said second shoe can be set into a circulating movement on said filter.

19. An apparatus for treating particulate material, comprising:
- a container having a process chamber for containing said particulate material and a container central duct separated from said process chamber, said container further having a longitudinal mid-axis;
- said process chamber being arranged around said longitudinal mid-axis of said container and being formed as an annular chamber, said process chamber further having a lower region and an upper region which is open;
- said container central duct forming a flow duct for process air and opening into said lower region of said process chamber, and communicating with said upper region of said process chamber so as to conduct process air in at least one first operating state;
- a fan arranged in a lower region of said container central duct for producing a flow of said process air in said container central duct from top to bottom and arranged immediately adjacent to an opening area of said container central duct into said process chamber, wherein said fan has fan blades whose radially outer ends at least partly project into said opening area of said container central duct into said process chamber;
- wherein said process chamber is rotatably fixed relative to said container central duct about said container longitudinal mid-axis;
- wherein said container is connectable to an external process air feed system and has a feed air duct which is connected to said container central duct; and
- wherein at least one of a valve and a gate is provided in order to connect said feed air duct to said container central duct so as to conduct said process air or to seal off said container central duct with respect to said feed duct.

20. The apparatus of claim 19, wherein, in an operating state in which said feed air duct is connected to said container central duct so as to conduct said process air, said at least one of said valve and said gate seals off said container central duct in a substantially airtight manner with respect to said open upper region of said process chamber.

21. An apparatus for treating particulate material, comprising:
- a container having a process chamber for containing said particulate material and a container central duct separated from said process chamber, said container further having a longitudinal mid-axis;
- said process chamber being arranged around said longitudinal mid-axis of said container and being formed as an annular chamber, said process chamber further having a lower region and an upper region which is open;
- said container central duct forming a flow duct for process air and opening into said lower region of said process chamber, and communicating with said upper region of said process chamber so as to conduct process air in at least one first operating state;
- a fan arranged in a lower region of said container central duct for producing a flow of said process air in said container central duct from top to bottom and arranged immediately adjacent to an opening area of said container central duct into said process chamber, wherein said fan has fan blades whose radially outer ends at least partly project into said opening area of said container central duct into said process chamber;

wherein said process chamber is rotatably fixed relative to said container central duct about said container longitudinal mid-axis;

wherein said container is connectable to an external process air feed system and has a feed air duct which is connected to said container central duct; and wherein at least one of a valve and a gate is provided in order to connect said feed air duct to said container central duct so as to conduct said process air or to seal off said container central duct with respect to said feed air duct, and wherein said at least one of said valve or said gate has at least one operating position in which both said feed air duct is connected to said container central duct and said container central duct is connected to said open upper region of said process chamber, both so as to conduct process air.

22. An apparatus for treating particulate material, comprising:

a container having a process chamber for containing said particulate material and a container central duct separated from said process chamber, said container further having a longitudinal mid-axis;

said process chamber being arranged around said longitudinal mid-axis of said container and being formed as an annular chamber, said process chamber further having a lower region and an upper region which is open;

said container central duct forming a flow duct for process air and opening into said lower region of said process chamber, and communicating with said upper region of said process chamber so as to conduct process air in at least one first operating state;

a fan arranged in a lower region of said container central duct for producing a flow of said process air in said container central duct from top to bottom and arranged immediately adjacent to an opening area of said container central duct into said process chamber, wherein said fan has fan blades whose radially outer ends at least partly project into said opening area of said container central duct into said process chamber;

wherein said container is connectable to an external process air feed system and has a feed air duct which is connected to said container central duct, and wherein above said process chamber there is arranged a filter which is connected into the flow path of said feed air duct;

wherein said feed air duct has a first shoe arranged above said filter and covering a sector of said filter, and the second shoe opposite said first shoe and underneath said filter, which is connected to said container central duct, and wherein said first and said second shoe can be set into a circulating movement on said filter.

* * * * *